(12) United States Patent
de Marignan et al.

(10) Patent No.: US 6,171,529 B1
(45) Date of Patent: Jan. 9, 2001

(54) METHOD OF RELEASING A TRANSPARENT POLYMER MATERIAL FROM A MOLD AND ITS USE IN THE FABRICATION OF A TRANSPARENT POLYMER MATERIAL ARTICLE SUCH AS AN OPHTHALMIC LENS

(75) Inventors: Gil de Marignan, Talant; Gaston Derozier, Joinville-le-Pont, both of (FR)

(73) Assignee: Essilor International Compagnie General d'Optique, Charenton Cedex (FR)

(*) Notice: Under 35 U.S.C. 154(b), the term of this patent shall be extended for 0 days.

(21) Appl. No.: 09/273,185

(22) Filed: Mar. 19, 1999

(30) Foreign Application Priority Data

Mar. 17, 1999 (FR) .................................................. 99 03291

(51) Int. Cl.[7] ...................................................... B29D 11/00
(52) U.S. Cl. .............................. 264/2.3; 264/2.6; 264/334
(58) Field of Search ............................... 264/1.1, 2.2, 2.3, 264/2.6, 334; 425/436 R, 436 RM

(56) References Cited

U.S. PATENT DOCUMENTS

| 3,171,869 | 3/1965 | Weinberg et al. |
|---|---|---|
| 4,909,969 | * 3/1990 | Wood ...................................... 264/2.3 |
| 5,358,672 | * 10/1994 | Blum ...................................... 264/2.3 |
| 5,750,156 | 5/1998 | Maus et al. .......................... 425/139 |

FOREIGN PATENT DOCUMENTS 0 710 540 A2  10/1995  (EP).
WO 97/39880  10/1997  (WO).

* cited by examiner

*Primary Examiner*—Mathieu D. Vargot
(74) *Attorney, Agent, or Firm*—O'Keefe, Egan & Peterman

(57) ABSTRACT

A method of releasing from the mold a transparent polymer material article formed in a cavity of a two-part mold by polymerizing a liquid polymerizable substance includes the step of uniformly heating the article in the mold to a mold release temperature in the range from Tg+20° C. to Tg+80° C., where Tg is the glass transition temperature of the transparent polymer material, without separating the article and the mold parts. An external mechanical force is applied to separate at least one of the mold parts from the article while it is at the mold release temperature.

16 Claims, 1 Drawing Sheet

METHOD OF RELEASING A TRANSPARENT POLYMER MATERIAL FROM A MOLD AND ITS USE IN THE FABRICATION OF A TRANSPARENT POLYMER MATERIAL ARTICLE SUCH AS AN OPHTHALMIC LENS

BACKGROUND OF THE INVENTION

1. Field of the Invention

The present invention concerns a method of releasing from a mold transparent polymer material articles such as ophthalmic lenses (in particular spectacle lenses) made by pouring and polymerizing a polymerizable liquid substance into the cavity of a two-part mold.

2. Description of the Prior Art

Transparent polymer material (organic glass) ophthalmic lenses are conventionally made by pouring and polymerizing a polymerizable liquid substance into the cavity formed between two parts of a mineral glass mold, the assembly being held together by fixing means such as clips. The assembly is commonly called a "sandwich".

After polymerization the fixing means are removed and the mold is dismantled to recover the ophthalmic lens.

The polymerizable liquid substances used vary widely, depending on the required refractive index of the ophthalmic lens.

Many of these substances, for example substances comprising a monomer such as diethylene glycol bis (allylcarbonate) (CR39$^{200}$), shrink significantly on polymerization, by an amount in the order of 7% or more, generally 10% or more, creating tensile stresses in the ophthalmic lens within the sandwich.

Some ophthalmic lenses, in particular lenses with a positive optical power, can have random defects that are visible when they are subsequently colored, for example by dipping them into an aqueous dispersion of pigment. Because of their shape these defects are commonly called "ferns".

The defects are probably due to sudden relieving of stresses during mold release, especially in the case of substances which shrink greatly on polymerization and positive optical power ophthalmic lenses.

U.S. Pat. No. 3,171,869 describes a method of releasing from the mold ophthalmic lenses obtained by polymerizing a liquid substance, in particular one which shrinks greatly on polymerization, which consists in heating the sandwich to a temperature in the range from 125° C. to 235° C. just before polymerization is completed to soften the material of the lens and simultaneously relieve the polymerization stress. During this heating the polymerized material separates from the surface of the mold.

The mold release method of U.S. Pat. No. 3,171,869 reduces the risk of breaking molded lenses when releasing them from the mold. However, the molded lens inevitably separates from the surface of the mold on heating or shortly after cooling and this induces stresses that can lead to the formation of ferns.

Document WO 97/39880 describes a method of making lenses including a step of transferring heat by conduction from the surface of the mold in order to increase the degree of polymerization of the surface of the lens to obtain a more homogeneous distribution of color over the surface of the lens during subsequent coloring.

Because heating is effected by conduction of heat from a surface of the sandwich, the sandwich is not heated uniformly and this can induce stresses in the polymerized lens.

It would therefore seem desirable to develop a method of releasing from the mold transparent polymer material articles such as lenses obtained by polymerizing a polymerizable liquid substance in the cavity of a two-part mold that significantly reduces the risk of ferns and other defects occurring during subsequent coloring of the lenses.

SUMMARY OF THE INVENTION

In accordance with the invention, the above aim is achieved by a method of releasing from the mold a transparent polymer material article formed in a cavity of a two-part mold by polymerizing a liquid polymerizable substance, including:

a) uniformly heating the article in the mold to a mold release temperature in the range from Tg+20° C. to Tg+80° C., preferably in the range from +30° C. to +60° C., where Tg is the glass transition temperature of the transparent polymer material, without separating the article and the mold parts, and b) applying an external mechanical force to separate at least one of the mold parts from the article while it is at the mold release temperature.

The mold release temperature is an important feature of the method of the invention. If the temperature is too low the stresses are suddenly relieved on release from the mold and fern type defects appear in the articles and if the temperature is too high there is a high risk of the article breaking and/or yellowing. Generally speaking, the upper limit on the mold release temperature is in the order of 160° C. For example, in making ORMA® lenses by polymerizing a liquid substance comprising a diethylene glycol diallyl carbonate monomer, the mold release temperature is in the order of 120° C.

The article is uniformly heated for at least 30 minutes and preferably at least 40 minutes.

The sandwich and consequently the molded article can be heated to the mold release temperature by any appropriate means, such as pure convection or infrared radiation, but heating is preferably effected by means of a combination of infrared radiation and convection. Heating must be as uniform as possible to eliminate excessive temperature gradients and to prevent premature mold release due to thermal shock, leading to articles with many ferns. This applies in particular to ophthalmic lenses of positive optical power and especially high positive optical power, for example greater than +3.00 diopters.

Generally speaking, after polymerization, and before the method of the present invention is applied, the temperature of the mold assembly is reduced to a temperature in the range from 20° C. to 60° C.

Although in the method of the invention only one part of the mold is generally separated from the molded article on application of the external mechanical force at the mold release temperature, the other part being separated subsequently, it is possible to separate both parts of the mold from the molded article simultaneously by applying the external mechanical force at the mold release temperature.

The external mechanical force for separating the parts of the mold from the molded article can conveniently be applied by means of a tool operating in the manner of a lever between the two mold parts.

BRIEF DESCRIPTION OF THE DRAWING

The single FIGURE of the accompanying drawing shows one embodiment of the method in accordance with the invention of disassembling mold parts after molding a positive optical power ophthalmic lens 1 and releasing, in the conventional way, clips and seals holding the mold parts 2, 3 during molding, a tool 4 such as a spatula being inserted between the mold parts for this purpose.

DETAILED DESCRIPTION OF THE PREFERRED EMBODIMENT

Figure 1:
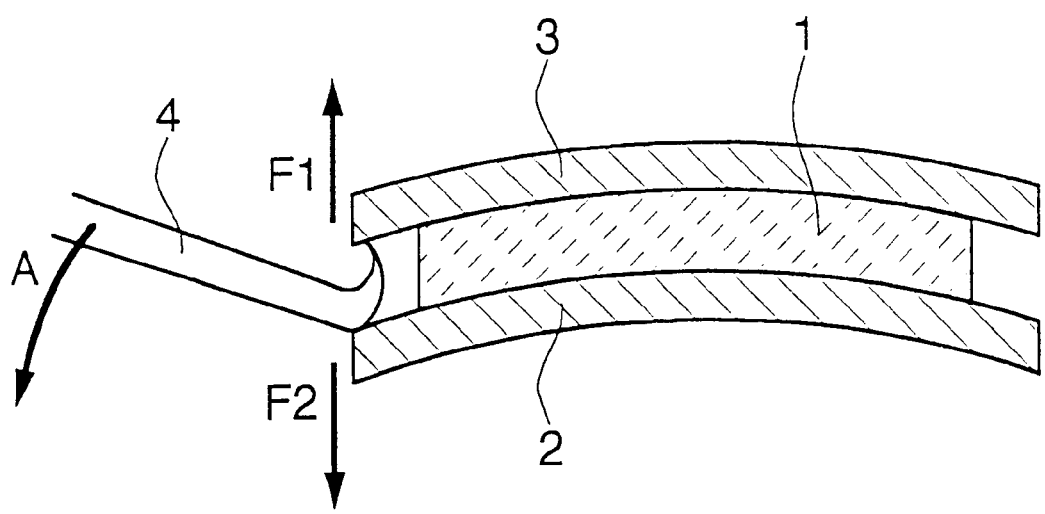

As shown in FIG. 1, the tool 4 is inserted so that it can act as a lever whose fulcrum is preferably the point of contact of the tool with the inside surface of the convex part 2 of the mold, and one end of the tool is brought into contact with the inside surface of the concave part 3 of the mold. Accordingly, by applying a force to the free end of the tool in the direction indicated by the arrow A, the tool, acting as a lever, applies to the convex and concave mold parts 2, 3 external separation forces F1 and F2 in opposite directions separating at least the concave part 3 of the mold when the ophthalmic lens 1 is at the mold release temperature.

A semi-automatic machine can be used instead of the spatula.

The following examples illustrate the present invention.

The molds used are conventional molds for making positive optical power ophthalmic lenses and comprise a convex part and a concave part made of mineral glass and a rubber seal, the mold being held closed by a clip.

Molds of the above kind were used to mold in the conventional way ORMA® organic glass lenses 1.5 mm thick at the center and having a power of +6 diopters.

CR39$^{200}$ monomer was mixed with 2.5% PIP (isopropyl peroxy dicarbonate). The mixture was filtered, degassed and poured into an assembly comprising two mineral glass mold parts and a seal held together by a metal clip.

The hole was polymerized in an oven with a heat cycle of 17 hours.

After polymerization, the clips and the seals were removed, the sandwiches were washed with a dilute aqueous soda solution at approximately 70° C. and after washing the sandwiches were brushed for enhanced cleaning.

At the end of washing and brushing the assemblies (sandwiches) were generally at a temperature in the range from 25° C. to 50° C.

A first series of clean and dry sandwiches was subjected to the following conventional disassembly process.

The clean and dry sandwiches were heated to approximately 70° C. in an oven and after removing them from the oven a spatula was inserted between the mold parts in the manner previously described and an external separating force was applied by means of the spatula.

The concave part of the mold separated from the lens but the lens usually remained stuck to the convex part of the mold.

The lens was then separated from the convex part by blowing in compressed air and recovered.

(The mold parts can then be reassembled with a new seal and taking care not to introduce dust, and a new lens can be molded by the process previously employed).

A second series of sandwiches was subjected to the disassembly process of the invention, heating the clean and dry sandwiches to 120° C. using the following cycle:

1. 30 to 45 minutes in a first oven at 80° C.
2. 30 to 45 minutes in a second oven at 100° C.–110° C.
3. Exposure to infrared radiation to heat them to a temperature of approximately 120° C. (taking 50 seconds).

The sandwiches were then immediately disassembled at the temperature of 120° C. using a spatula inserted between the mold parts and as described above.

The concave part of the mold separated from the lens but the lens usually remained stuck to the convex part.

After cooling, the convex part of the mold was separated from the lens as described above.

The two series of lenses were then subjected to a coloring step consisting in immersing the lenses in an aqueous bath containing dispersed coloring agents and maintained at a temperature close to 95° C.

The occurrence of ferns was determined for each series of lenses. For the lenses of the first series (disassembled conventionally at 70° C.), there were approximately 50% ferns whereas for the lenses of the second series, removed from the mold using the process of the invention, there were less than 2% ferns.

Thus the mold release method of the invention very significantly reduces the occurrence of ferns in ophthalmic lenses.

What is claimed is:

1. A method of releasing from the mold a transparent polymer material article formed in a cavity of a two-part mold by polymerizing a liquid polymerizable substance, including:

a) uniformly heating said article in said mold to a mold release temperature in the range from Tg+20° C. to Tg+80° C., where Tg is the glass transition temperature of the transparent polymer material, without separating said article and said mold parts, and b) applying an external mechanical force to separate at least one of said mold parts from said article while it is at said mold release temperature.

2. The method claimed in claim 1 wherein said article is uniformly heated in said mold for at least 30 minutes.

3. The method claimed in claim 1 wherein said transparent polymer material is a material that shrinks at least 7%.

4. The method claimed in claim 1 wherein said transparent polymer material is produced by polymerizing a polymerizable liquid substance comprising a diethylene glycol diallyl carbonate monomer.

5. The method claimed in claim 1 wherein said external mechanical force is applied by means of a tool operating in the manner of a lever on said mold part.

6. The method claimed in claim 5 wherein said mold parts comprise a convex part and a concave part.

7. The method claimed in claim 6 wherein said tool operating as a lever has a fulcrum on said convex part.

8. The method claimed in claim 7 wherein only said concave part is separated from said molded article on application of said external mechanical force.

9. The method claimed in claim 1 wherein said article is an ophthalmic lens.

10. The method claimed in claim 9 wherein said ophthalmic lens is a positive optical power lens.

11. The method claimed in claim 1 wherein the temperature of said assembly is reduced before the uniform heating step, and after polymerization, to a temperature in the range from 20° C. to 60° C.

12. The method claimed in claim 1 wherein said mold release temperature is in the range from Tg+30° C. to Tg+60° C.

13. A method of making an article molded from a transparent polymer material including pouring a polymerizable liquid substance into a cavity of a two-part mold and polymerizing the poured substance to form the molded article, wherein said molded article is removed from said mold by the method claimed in claim 1.

14. A method of reducing the proportion of articles molded from transparent polymer material unsuitable for subsequent coloring treatment by making said molded articles by the method claimed in claim 13.

15. The method as claimed in claim 2, wherein said uniform heating step lasts for at least 40 minutes.

16. The method as claimed in claim 3, wherein said transparent polymer material shrinks at least 10% on polymerization.

* * * * *